Aug. 21, 1928.
A. J. MUSSELMAN
AUTOMOBILE BUMPER
Filed April 20, 1927
1,681,677
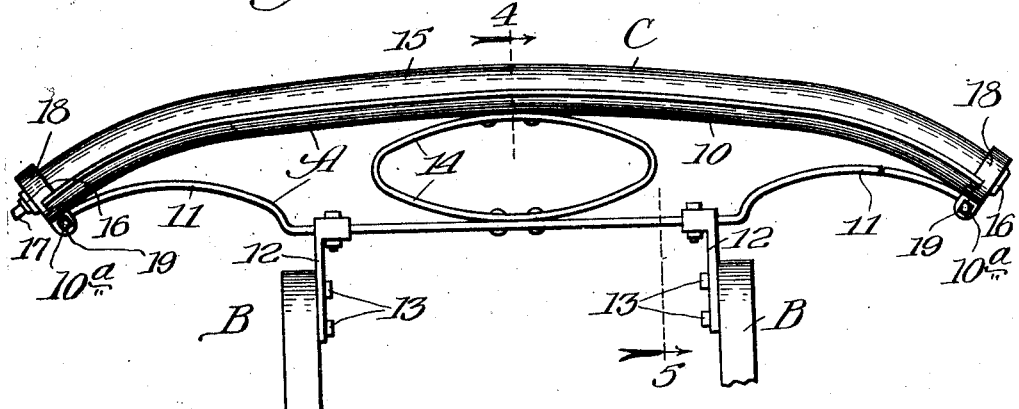
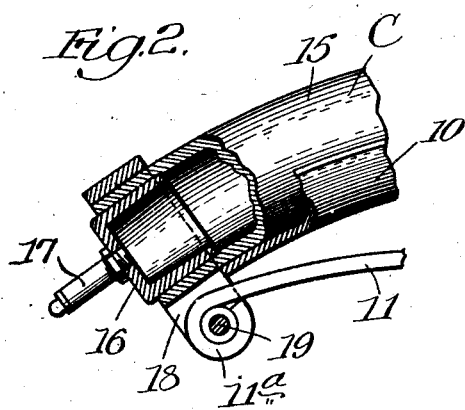
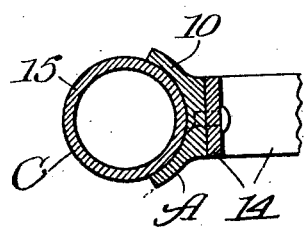
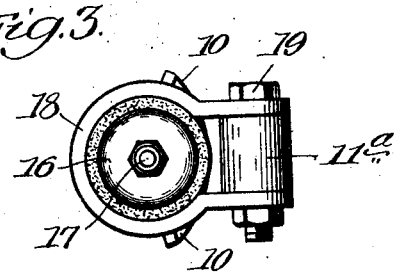
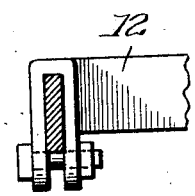
Inventor:
Alvin J. Musselman,
By Dyrenforth, Lee, Chritton and Wiles,
Attys.

Patented Aug. 21, 1928.

1,681,677

UNITED STATES PATENT OFFICE.

ALVIN J. MUSSELMAN, OF CHICAGO, ILLINOIS.

AUTOMOBILE BUMPER.

Application filed April 20, 1927. Serial No. 185,205.

This invention relates to automobile bumpers and is particularly concerned with bumpers of the pneumatic type. It is an object and purpose of the present invention to provide a pneumatic bumper which, by reason of its novel construction, completely eliminates any inner air carrying tube, use being made only of a single tube which may be cut from a length of the proper tubular material so that it has open ends and filling and completely closing said ends by a novel construction which positively precludes any escape of air from the pneumatic member of the bumper. A further object of the invention is to provide a bumper member and a backing therefor attached in such manner that inflation of the pneumatic member of the bumper causes the same to press tightly against the backing member and securely hug the same. Many other objects and purposes than those stated will be apparent as understanding of the invention is had from the following description taken in connection with the accompanying drawings, in which, Figure 1 is a top plan view of an automobile bumper embodying the invention applied to an automobile frame;

Fig. 2 is an enlarged detail of an end of the bumper showing the same partly in section;

Fig. 3 is an end elevation of the same; and

Figs. 4 and 5 are enlarged sections on the lines 4 and 5 respectively of Fig. 1.

The embodiment illustrated comprises an automobile bumper consisting essentially of a frame A which is adapted to be secured to the frame B of an automobile chassis, the frame carrying a pneumatic tubular member C.

The frame A as illustrated comprises a channel member 10 which preferably is made concaved on its outer face as shown in Fig. 4 to receive the pneumatic tubular member C which is preferably circular in cross section, although it will be understood that sections of various forms may be used if desired.

The channel 10 is carried upon a flat yieldable spring member 11 which passes through brackets 12, the latter being secured by means of bolts 13 to the chassis frame B. An elliptical spring member 14 or the like may be used to connect the center of the member 10 to the spring member 11.

The tubular pneumatic member C is made up of a tube 15 which is composed of fabric and rubber rolled to the desired size and shape and vulcanized in any well known manner. Any of the well known processes and materials used in the making of the fabric and cord tires and hose may be used in making this pneumatic tube.

Each end of the tube is closed by means of a metal cap 16 which is inserted into each end of the tube and in practice the outer sides of the cap are covered with shellac or other equivalent cement prior to such insertion. An air valve 17 is secured in one of these caps and this is adapted to receive a well known type of fitting commonly used for filling automobile tires with air.

In the embodiment shown a clamp 18 of flat bar metal is located around each end of the tube over the same where it presses against the cap 16. The clamp 18 has outwardly extending ears between which an eye $11^a$ of the spring member 11 is located, a bolt 19 passing through said ears and the eye and serving to bind the end of tube C against the outer sides of the cap 16 making a connection which precludes any escape of air between the inner walls of the tube and the outer sides of the end-closing cap 16.

It will be observed in Figs. 1 and 2 that the end of the channel member 10 is cut away at $10^a$ to receive the ears of the clamp 18. Thus, in assembling, the rubber tube 15 when deflated is slightly longer than the channel member 10 or it may be stretched sufficiently that the clamps 18 can be readily inserted into the recess $10^a$ after which the bolts 19 are secured in place.

On inflating the rubber tube with air through the valve 17, the tube 15 is increased in diameter and decreased in length so as to draw it snugly down against the channel member 10. This member, as will be observed in Fig. 1, is slightly arched in the center and given a fairly good curve at the ends so that this shortening action when inflated causes it to hug the channel member throughout its length. With a bumper of the type described economy in manufacture is secured. The tube from which the pneumatic member C is cut may be manufactured in any desired length in a factory and the proper length for a bumper cut therefrom, it not being necessary to close the ends of the tube in manufacturing the same. The caps 16 which close the ends of the tube are of cheap and economical construction, are inserted easily in the ends of the tube and the clamps 18 are very quickly and easily applied, and when once drawn to position insure against any escape of air. The use of inner tubes to hold air is wholly avoided. Inflating the tube increases its diameter and tends to shorten the tube in length, whereby the pneumatic tube C firmly and securely hugs the backing member 10 in the same way that an inflated pneumatic tire grips a tire rim around which it is placed. Assembly is very quick and easy. The bumper described is one commercially practical due to its reliability in holding and maintaining the air pressure as it should be and due also to its economy in manufacture. The idea of pneumatic bumpers broadly is not new, but all designs which have heretofore been made have been impractical, chiefly by reason of the impossibility of manufacturing the same at a cost which would not be prohibitive. The structure which I have devised by the elimination of expensive parts is practical from every standpoint and has so proved in service.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In an automobile bumper, a yieldable support having a supporting member of concave cross-section, said member being arcuate; a pneumatic tube secured in the concave portion of said arcuate member, an air valve on said tube, a clamp at each end of said tube having laterally projecting ears adapted to engage in notches on the ends of said supporting members.

2. In an automobile bumper, a support having an elongated backing member of curved form and a pneumatic facing therefor comprising a tube of air-tight material having means adapting it to be inflated and having open ends, plugs closing the open ends of said tube, means for clamping the end portions of said tube tightly against said plugs to make air-tight connections, and means for securing said clamping means to the ends of said support whereby on inflating said pneumatic member the ends thereof are held against movement and the pneumatic member is brought into tight hugging engagement with said curved support.

3. In an automobile bumper, an elongated curved support, a single pneumatic tube having means adapting it to be inflated, located against the front side of said support, said tube having open ends, plugs closing the ends of said tube, and means for clamping the ends of the tube against said plugs to make air-tight connections, said means having detachable connection with the ends of said support.

4. In an automobile bumper, an elongated curved car support of concave cross section, a pneumatic tube located in the concave side of said support, said tube having open ends, metal members filling the ends of said tube, and means for clamping the ends of the tube against said metal members to make air-tight joints, and means for connecting said last-mentioned means to the ends of the support.

5. In an automobile bumper, an elongated curved supporting member of concave cross section, a pneumatic tube secured in the concave portion of said supporting member, an air valve carried by said tube, plugs closing the open ends of the tube, clamps clamping the ends of the tube on said plugs, and means for detachably securing said clamps to the ends of the supporting member.

ALVIN J. MUSSELMAN.